US010399496B2

(12) United States Patent
Kosugi et al.

(10) Patent No.: US 10,399,496 B2
(45) Date of Patent: Sep. 3, 2019

(54) VIEWING DEVICE FOR VEHICLE AND METHOD OF DISPLAYING VIEWED IMAGE FOR VEHICLE (71) Applicant: KABUSHIKI KAISHA TOKAI-RIKA-DENKI-SEISAKUSHO, Aichi-ken (JP)

(72) Inventors: Masanori Kosugi, Aichi-ken (JP); Tetsuya Egawa, Aichi-ken (JP); Takuya Hayashi, Aichi-ken (JP); Takashi Nagao, Aichi-ken (JP); Naofumi Kato, Aichi-ken (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 0 days.

(21) Appl. No.: 15/684,463

(22) Filed: Aug. 23, 2017

(65) Prior Publication Data
US 2018/0056870 A1 Mar. 1, 2018

(30) Foreign Application Priority Data

Aug. 26, 2016 (JP) .................. 2016-165753

(51) Int. Cl.
B60R 1/00 (2006.01)
B60R 1/12 (2006.01)
H04N 5/272 (2006.01)
H04N 5/232 (2006.01)
H04N 5/262 (2006.01)
H04N 7/18 (2006.01)

(52) U.S. Cl.
CPC .................. B60R 1/00 (2013.01); B60R 1/12 (2013.01); H04N 5/23296 (2013.01); H04N 5/2628 (2013.01); H04N 5/272 (2013.01); H04N 7/181 (2013.01); B60R 2001/1253 (2013.01); B60R 2300/105 (2013.01); B60R 2300/20 (2013.01); B60R 2300/303 (2013.01); B60R 2300/8006 (2013.01); B60R 2300/8066 (2013.01); H04N 5/23293 (2013.01)

(58) Field of Classification Search
None
See application file for complete search history.

(56) References Cited

U.S. PATENT DOCUMENTS

2007/0273764 A1* 11/2007 Yamada .................... B60R 1/00
348/148
2014/0292805 A1* 10/2014 Yamada ................. G09G 5/377
345/629
2016/0042543 A1* 2/2016 Hashimoto .............. B60R 1/00
345/629

FOREIGN PATENT DOCUMENTS

JP 2008149878 A * 7/2008
JP 2014-60646 A 4/2014

* cited by examiner

Primary Examiner — Lindsay J Uhl
(74) Attorney, Agent, or Firm — Roberts Mlotkowski Safran Cole & Calderon, P.C.

(57) ABSTRACT

There is provided a viewing device for a vehicle, including: an imaging portion that captures an image of a rear of a vehicle from a vehicle exterior; and a display portion that carries out image processing that combines a first captured image that has been captured by the imaging portion and a second captured image that shows a vehicle cabin interior in which a vehicle rear including the vehicle cabin interior is captured from the vehicle cabin interior, such that a region of a rear side window glass becomes longer than an apparent width of the rear side window glass that is actually seen from a position of capturing the second captured image, and displays the images.

4 Claims, 6 Drawing Sheets

VIEWING DEVICE FOR VEHICLE AND METHOD OF DISPLAYING VIEWED IMAGE FOR VEHICLE

CROSS-REFERENCE TO RELATED APPLICATION

This application is based on and claims priority under 35 USC 119 from Japanese Patent Application No. 2016-165753 filed on Aug. 26, 2016, the disclosure of which is incorporated by reference herein.

BACKGROUND

Technical Field

The present disclosure relates to a viewing device for a vehicle and a method of displaying a viewed image for a vehicle that capture an image of a periphery of a vehicle and display the captured image in order to view the periphery of the vehicle.

Related Art

Japanese Patent Application Laid-Open (JP-A) No. 2014-60646 proposes an image processing device having: generating means for, by using plural images acquired by plural cameras provided at a vehicle, generating a peripheral image that shows the peripheral region of the vehicle from a virtual viewpoint; acquiring means for acquiring a vehicle image that shows the vehicle seen from the virtual viewpoint; transmitting means for increasing the transmittance of a specific region of a portion of the vehicle image to be higher than the transmittance of the other portions; combining means for combining the peripheral image and the vehicle image so as to generate a combined image; and outputting means for outputting and displaying the combined image to and onto a display device.

In a case in which images are combined and an image that is the same as that of an optical inner rearview mirror is displayed as in JP-A No. 2014-60646, the apparent width of the rear side window glass appears to be more narrow than the ratio of the actual widths of the rear windshield glass and the rear side window glass, in the same way as in the case of an optical mirror.

Therefore, the region that can be seen through the rear side window glass is narrow, in the same way as with an optical mirror.

SUMMARY

The present disclosure provides a viewing device for a vehicle and a method of displaying a viewed image for a vehicle that can improve the visibility of the rearward field of view through the rear side window glass.

A first aspect of the present disclosure has: an imaging portion that captures an image of a rear of a vehicle from a vehicle exterior; and a display portion that carries out image processing that combines a captured image (first captured image) that has been captured by the imaging portion, and an image (second captured image) that shows the vehicle cabin interior in which the rear including a vehicle cabin interior is captured from the vehicle cabin interior, and such that a region of a rear side window glass becomes longer than an apparent width of the rear side window glass that is actually seen from a position of capturing the image that shows the vehicle cabin interior, and the display portion displays the images.

In accordance with the first aspect of the present disclosure, an image of the rear of the vehicle is captured from the vehicle exterior by the imaging portion. The imaging portion is provided, for example, at the rear bumper or the like, and captures images of the rear of the vehicle. Or, imaging portions may be provided respectively at the door mirrors and the rear bumper and the like, and may capture images of the rear of the vehicle.

At the display portion, image processing is carried out that combines a captured image that has been captured by the imaging portion, and an image that shows the vehicle cabin interior in which the rear including a vehicle cabin interior is captured from the vehicle cabin interior, and that is such that a region of a rear side window glass becomes longer than an apparent width of the rear side window glass that is actually seen from a first imaging portion, and the images are displayed. Due thereto, the rear side window glass becomes longer than the apparent width that is actually seen from the position of capturing the image that shows the vehicle cabin interior, and therefore, the visibility of the rearward field of view through the rear side window glass can be improved.

Note that the display portion may carry out image processing that converts the captured image and the image that shows the vehicle cabin interior respectively so as to become captured images that are seen from virtual viewpoints that are set at respective predetermined positions, and that respectively converts the images so as to become captured images that are projected from the virtual viewpoints onto a virtual screen that is provided at the rear of the vehicle, and the display portion may display the images (a second aspect). Due thereto, the rear side window glass can be made to be longer than the apparent width that is actually seen from the position of the first imaging portion.

Further, the display portion may carry out image processing that converts the captured image and the image that shows the vehicle cabin interior respectively so as to become captured images that are seen from virtual viewpoints that are set at respective predetermined positions, and respectively converts the images so as to become captured images that are projected from the virtual viewpoints onto a virtual screen that is provided at the rear of the vehicle and is curved convexly rearward, and converts the respective converted captured images into captured images that are expanded planarly, and the display portion may display the images (a third aspect). Due thereto, the rear side window glass can be made to be longer than the apparent width that is actually seen from the position of the inner rearview mirror.

An image that has been captured in advance may be used as the image that shows the vehicle cabin interior. However, the viewing device for a vehicle may further have a vehicle cabin interior imaging portion that captures the image that shows the vehicle cabin interior (a fourth aspect). Due thereto, it is possible to also display passengers who are within the vehicle cabin, and the actual vehicle cabin interior can be reproduced.

Further, the display portion may be disposed at a position of an inner rearview mirror and may have, at a display surface side thereof, a half-mirror that has a curved surface shape (a fifth aspect). Even if the display portion is malfunctioning, the rearward field of view can be ensured by the half-mirror. Further, because the half-mirror has a curved surface shape, the effect that the width of the rear side window glass appears to be narrow is mitigated somewhat, and the difference between the image displayed on the display portion and the image of the half-mirror is reduced, and the sense of incongruity at the time when the display portion is not carrying out display is suppressed.

Further, the display portion may be disposed at a position of an inner rearview mirror and may have, at a display surface side thereof, a half-mirror of a viewpoint that differs from a viewpoint of a captured image that is displayed (a sixth aspect).

A method of displaying a viewed image for a vehicle of a seventh aspect of the present disclosure includes: capturing, by an imaging portion, an image of a rear of a vehicle from a vehicle exterior; and carrying out image processing that combines a captured image that has been captured by the imaging portion, and an image that shows the vehicle cabin interior in which the rear including a vehicle cabin interior is captured from the vehicle cabin interior, and such that a region of a rear side window glass is longer than an apparent width of the rear side window glass that is actually seen from a position of capturing the image that shows the vehicle cabin interior, and displaying the images on a display portion.

In accordance with the seventh aspect of the present disclosure, image processing is carried out that combines a captured image that has been captured by the imaging portion, and an image that shows the vehicle cabin interior in which the rear including the vehicle cabin interior is captured from the vehicle cabin interior, and that is such that the region of the rear side window glass becomes longer than the apparent width of the rear side window glass that is actually seen from the first imaging portion, and the images are displayed on the display portion. Therefore, the visibility of the rearward field of view through the rear side window glass can be improved.

Note that the image processing may be processing that converts the captured image and the image that shows the vehicle cabin interior respectively so as to become captured images that are seen from virtual viewpoints that are set at respective predetermined positions, and respectively converts the images so as to become captured images that are projected from the virtual viewpoints onto a virtual screen that is provided at the rear of the vehicle (an eighth aspect). Due thereto, the rear side window glass can be made to be longer than the apparent width that is actually seen from the position of the first imaging portion.

Further, the image processing may be processing that converts the captured image and the image that shows the vehicle cabin interior respectively so as to become captured images that are seen from virtual viewpoints that are set at respective predetermined positions, and respectively converts the images so as to become captured images that are respectively projected from the virtual viewpoints onto a virtual screen that is provided at the rear of the vehicle and is curved convexly rearward, and converts the respective converted captured images into captured images that are expanded planarly (a ninth aspect). Due thereto, the rear side window glass can be made to be longer than the apparent width that is actually seen from the position of the inner rearview mirror.

As described above, in accordance with the present disclosure, there is the effect of providing a viewing device for a vehicle that can improve the visibility of the rearward field of view through the rear side window glass.

BRIEF DESCRIPTION OF THE DRAWINGS

Exemplary embodiments of the present disclosure will be described in detail based on the following figures, wherein.

DETAILED DESCRIPTION

Figure 1:
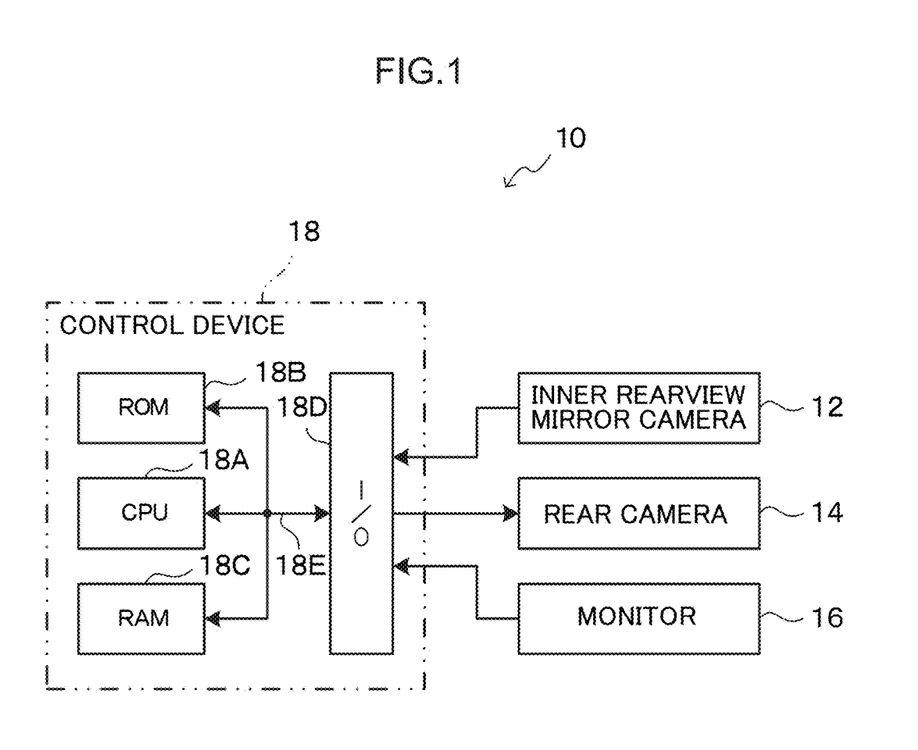
FIG. 1 is a block drawing showing the schematic structure of a viewing device for a vehicle relating to a present embodiment.

An example of an embodiment of the present disclosure is described in detail hereinafter with reference to the drawings. FIG. 1 is a block drawing showing the schematic structure of a viewing device for a vehicle relating to a present embodiment.

A viewing device 10 for a vehicle relating to the present embodiment has an inner rearview mirror camera 12, a rear camera 14, a monitor 16 and a control device 18.

The inner rearview mirror camera 12 corresponds to a first imaging portion, and captures an image of the rear of the vehicle including the interior of the vehicle cabin, and outputs the results of imaging to the control device 18. The inner rearview mirror camera 12 is disposed, for example, in a vicinity of the ceiling at the upper portion of the front windshield glass that is at a front, upper portion of the center between the front seats within the vehicle cabin.

The rear camera 14 corresponds to a second imaging portion, and captures an image of the rear of the vehicle and outputs the results of imaging to the control device 18. The rear camera 14 is disposed, for example, at the rear bumper at the exterior of the vehicle, or the like.

The monitor 16 is provided within the inner rearview mirror, and is connected to the control device 18. Due to control of the control device 18, the monitor 16 generates an image for rearward viewing by using the respective results of imaging of the inner rearview mirror camera 12 and the rear camera 14, and displays the image for rearward viewing. Note that a half-mirror is provided at the display surface side of the monitor 16 of the inner rearview mirror. At times when the monitor 16 is not displaying an image, the rearward field of view can be checked by using the half-mirror. Further, the monitor 16 and the control device 18 correspond to a display portion.

The control device 18 is structured by a microcomputer in which a CPU 18A, a ROM 18B, a RAM 18C, and an I/O (input/output interface) 18D are respectively connected to a bus 18E.

Various types of programs such as a viewing control program for the vehicle, which is for carrying out display control that displays the image for rearward viewing on the monitor 16, and the like are stored in the ROM 18B. Control of display onto the monitor 16 is carried out due to programs that are stored in the ROM 18B being expanded in the RAM 18C and being executed by the CPU 18A.

The I/O 18D is connected respectively to the inner rearview mirror camera 12, the rear camera 14 and the monitor 16.

In the present embodiment, the control device 18 generates an image for rearward viewing by using the results of imaging of the inner rearview mirror camera 12 and the results of imaging of the rear camera 14, and displays the image for rearward viewing on the monitor 16. The method of generating the image for rearward viewing is described here.

In the present embodiment, the image of the interior of the vehicle cabin that is captured by the inner rearview mirror camera 12, and the image that shows the rear of the vehicle from the exterior of the vehicle, are combined with the transparencies thereof being made to differ from one another. Here, if the images are merely combined, in a case in which the interior of the vehicle cabin including the front side window portions is viewed from the position of the inner rearview mirror camera 12, the regions that can be seen through the rear side window glasses are small.

Figure 2:
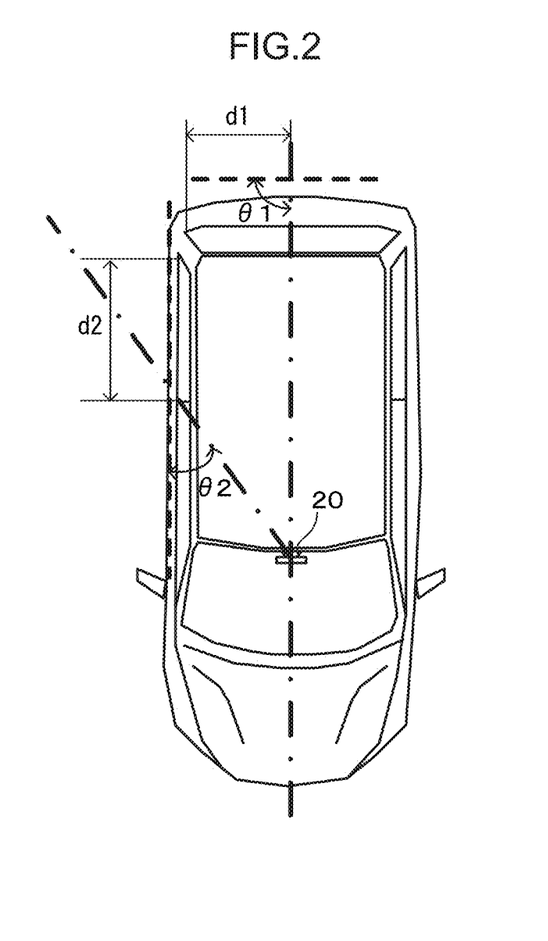
FIG. 2 is a drawing for explaining that the apparent width of a rear side window glass appears to be narrow.

Concretely, as shown in FIG. 2, a case is supposed in which the rear of the vehicle is captured over a wide angle from a vicinity of an inner rearview mirror 20, and the viewing angles of the rear windshield glass and the rear side window glass are hypothetically the same. Angle θ1 that is formed by the direction of the sightline and the rear windshield glass is substantially orthogonal to the rear windshield glass. Therefore, apparent width d1 of the glass as seen from the inner rearview mirror camera 12 is substantially as it is.

On the other hand, at the rear side window glass, the angle formed by the direction of the sightline and the glass is θ2. Therefore, width d2 is apparently narrow. For example, supposing that θ2 is 30°, the apparent width of the rear windshield glass is d1×sin θ1=d1×sin(90°)=d1. On the other hand, the apparent width of the rear side window glass is d2×sin θ2=d1×sin(30°)=d2/2. Here, even if d1=d2, the apparent width of the rear side window glass will inevitably appear to be more narrow. Note that, in a case in which the front side window glass is viewed from the inner rearview mirror camera 12, this front side window glass is approximately directly horizontal, and, in the same way as the rear windshield glass, the apparent width thereof appears to be wider than that of the rear side window glass. The dimensions appearing to be this way is not limited to cases of viewing by using an electronic mirror that displays captured images, but the dimensions similarly appear this way also when viewed by using an optical mirror that is planar. However, when viewing by using an optical mirror having a curved surface, the effect that the width of the rear side window glass appears to be narrow is mitigated somewhat.

Thus, in the present embodiment, at the time of combining the respective captured images and displaying the combined image, the control device 18 carries out image processing so as to make the regions, which can be seen through the rear side windows, be wider, and combines the respective captured images, and displays the combined image on the monitor 16.

In the present embodiment, description is given of an example that uses a captured image of the one rear camera 14 as the method of imaging the rearward field of view. However, the number of cameras that capture images of the rear from the exterior of the vehicle is not limited to one. For example, at least three cameras may be installed, in vicinities of the left and right door mirrors and in a vicinity of the rear windshield glass, and the three captured images may be combined so as to generate the image for rearward viewing.

Figure 3A:
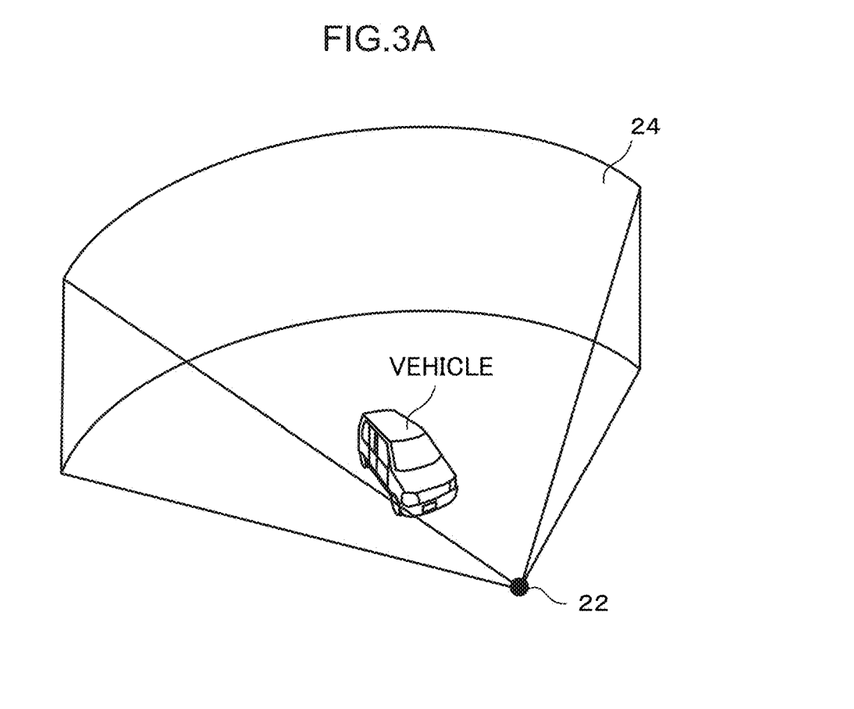
FIG. 3A is a drawing showing an example of a virtual viewpoint and a virtual screen.
Figure 3B:
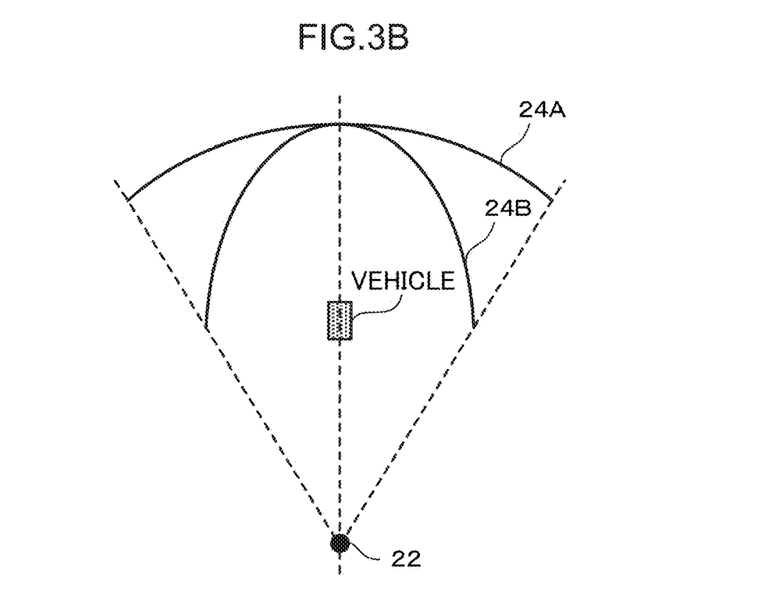
FIG. 3B is an upper view of FIG. 3A.

In the present embodiment, regardless of the number of cameras or the method of combining the images, as shown in FIG. 3, for the rearward field of view, a virtual viewpoint 22 is set further toward the vehicle front side than at least the position at which the inner rearview mirror camera 12 is set, and the captured image is converted into an image seen from the virtual viewpoint 22. At this time, a virtual screen 24 onto which the image of the rear of the vehicle is projected is set, and is converted into a rearward field of view that is seen from the virtual viewpoint 22. In other words, a scene that is the same as that of a case of regularly viewing the rear of the vehicle from the virtual viewpoint 22 is converted into an image that is in a state of being projected onto the virtual screen 24. Note that the virtual screen 24 may be planar, but is desirably an oval shape having curvature that is convex toward the rearward direction of the vehicle.

Further, the image that is projected onto the virtual screen 24 is displayed on the monitor 16 while being widened so as to still be planar. FIG. 3B is an upper view of FIG. 3A. If there is a virtual screen 24B at which the curvature of the virtual screen 24 projected from the virtual viewpoint 22 is large and that envelops the vehicle, the lateral direction of the vehicle will be imaged more in the image that is displayed on the monitor 16 of the inner rearview mirror 20. When viewed from the virtual viewpoint 22, there is no difference in a virtual screen 24A and the virtual screen 24B, but, if the respective screens are widened and display is carried out on the monitor 16, the lateral direction of the vehicle will be imaged more in the case of the virtual screen 24B that has the large curvature.

Figure 4A:
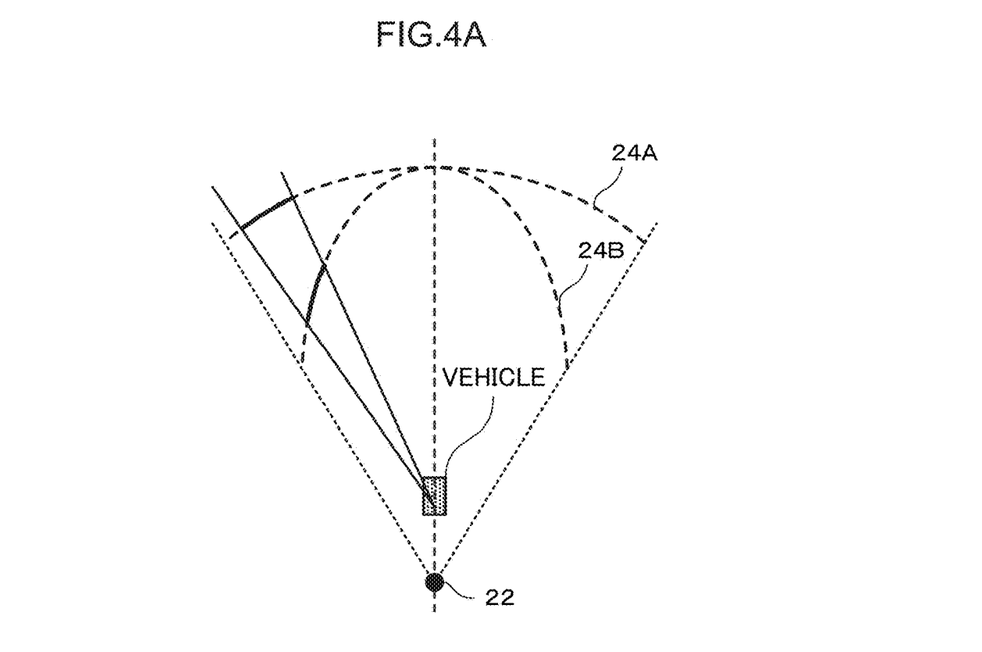
FIG. 4A is a drawing showing an example of marking the position of the virtual screen that can be seen through the window from the position of an inner rearview mirror of the vehicle, and is a drawing showing a case in which the virtual viewpoint and the position of the vehicle are close.
Figure 4B:
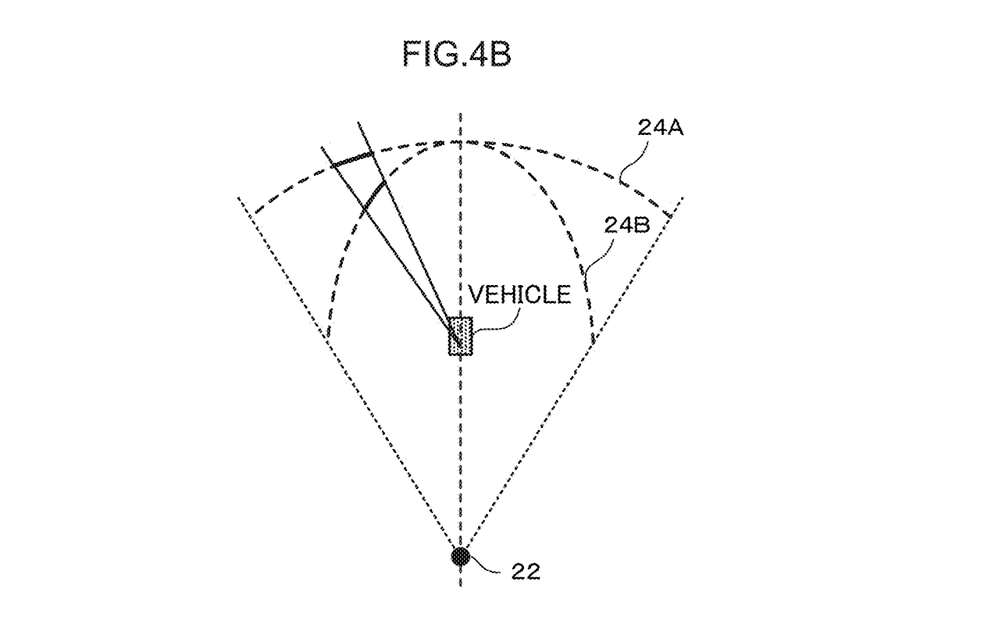
FIG. 4B is a drawing showing an example of marking the position of the virtual screen that can be seen through the window from the position of the inner rearview mirror of the vehicle, and is a drawing showing a case in which the virtual viewpoint and the position of the vehicle are far apart.

As described above, the virtual screen 24 is a screen in which the rear of the vehicle is seen from the virtual viewpoint 22. The viewpoint is different when the virtual screen 24 is seen from the position of the inner rearview mirror 20 of the vehicle. Therefore, how a place that is seen through a window will end up can be known by marking the position of the virtual screen 24 that can be seen through the window from the position of the inner rearview mirror 20 of the vehicle. For example, an example of marking (the thick line) is shown in FIG. 4. FIG. 4A shows a case in which the virtual viewpoint 22 and the position of the vehicle are close, and FIG. 4B shows a case in which the vehicle is far from the virtual viewpoint 22. The virtual screens 24A, 24B are shown with the two patterns overlapping for each of the patterns. In both cases, the viewing angle for viewing through the rear side window glass is the same. However, regardless of the positional relationship between the virtual viewpoint 22 and the vehicle, in a case in which the curvature of the screen is large, the marking is over a wide range as compared with a case in which the curvature of the screen is small. In all of the cases in FIG. 4, the position of marking shows which position of the screen is the place where the window can be seen through. Accordingly, it is possible to display an image, in which the width of the rear side window glasses is wider than conventionally, by widening the virtual screen 24 so as to become planar and generating and displaying an image for rearward viewing that is superposed on the positions, which correspond to the rear side window glasses, in the captured image of the vehicle cabin interior.

Figure 5:
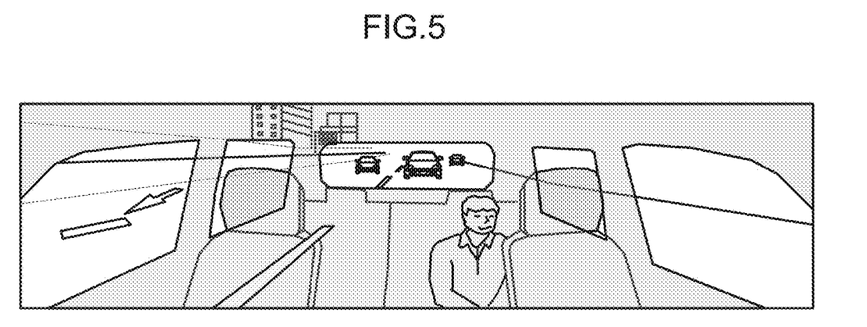
FIG. 5 is a drawing showing an example of a displayed image that is displayed on a monitor of the viewing device for a vehicle relating to the present embodiment.

In a case of viewing the rear of the vehicle from the position of the inner rearview mirror 20, the rear side window glass in particular is seen as being apparently narrow. Thus, as described above, the captured image of the vehicle cabin interior, in which a portion that is seen through a window can be viewed through the window, is displayed so as to be superposed on an image in which the image that is projected on the virtual screen 24 is expanded planarly. Due thereto, as shown in FIG. 5, the apparent width of the rearward field of view that can be seen through the windows does not become narrow as in the case of being viewed in a usual optical mirror, and a wide field of view through the windows can be ensured.

In the present embodiment, basically, the virtual viewpoint 22 and the viewpoint of the inner rearview mirror 20 are not superposed on one another. If the virtual viewpoint 22 and the viewpoint of the inner rearview mirror 20 are superposed, although it depends on the shape of the virtual screen 24 as well, the size of the windows in the image displayed on the monitor 16 of FIG. 5 is near to the actual ratio of the mirror, but, glancing thereat, it appears as if it were a panorama photograph. The shape of a vehicle is a rectangle that is long lengthwise as seen from the inner rearview mirror, and therefore, a sense of depth that is greater than that of a case of being viewed as a mere panorama photograph is desired. Thus, if the virtual viewpoint 22 is provided in front of the vehicle as described above in order for the image of the vehicle in the lateral direction to be included more in the inner rearview mirror 20, it will appear to be a rectangle that is long lengthwise as seen from the inner rearview mirror 20.

Figure 6:
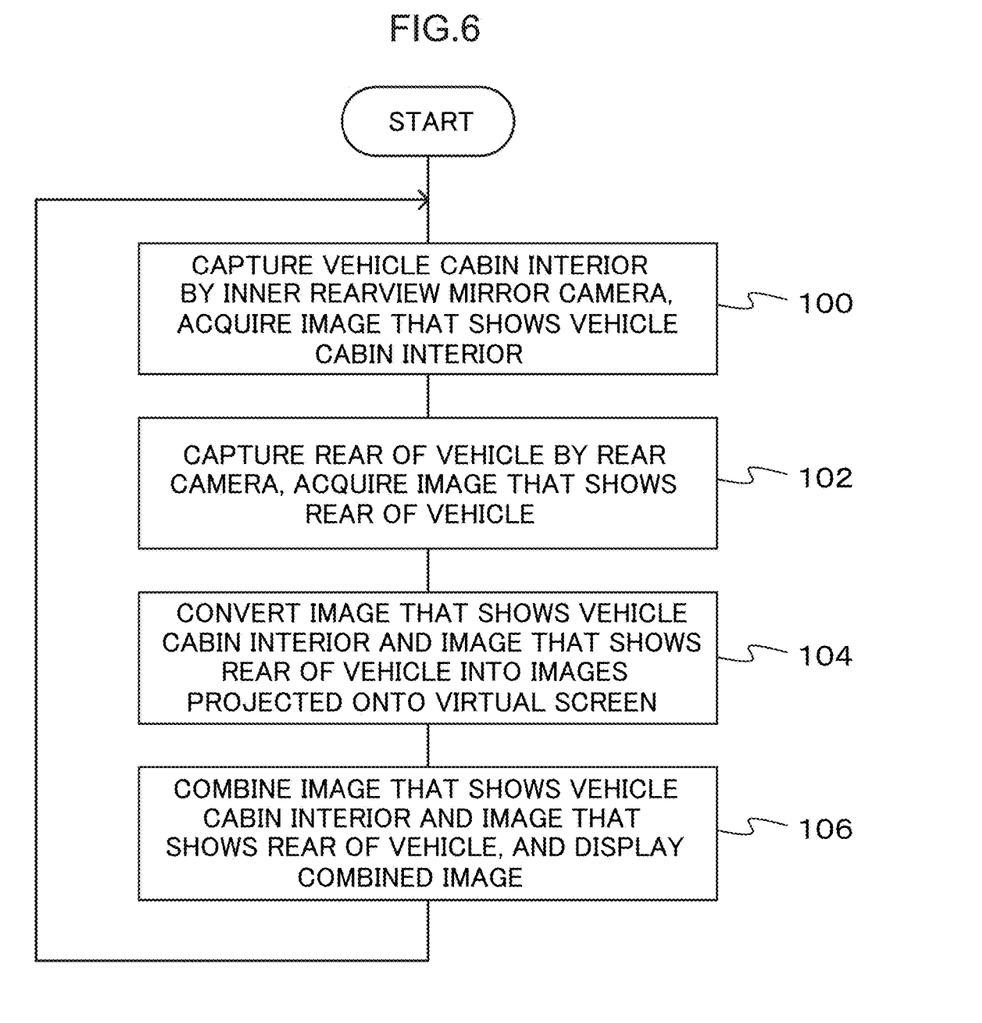
FIG. 6 is a flowchart showing an example of the flow of processings that are carried out at a control device of the viewing device for a vehicle relating to the present embodiment.

Concrete processings that are carried out at the control device 18 of the viewing device 10 for a vehicle that is structured as described above are described next. FIG. 6 is a flowchart showing an example of the flow of processings that are carried out at the control device 18 of the viewing device 10 for a vehicle relating to the present embodiment. Note that the processings of FIG. 6 start when an unillustrated ignition switch is turned on.

In step 100, the CPU 18A controls the inner rearview mirror camera 12 so as to carry out imaging of the vehicle cabin interior by the inner rearview mirror camera 12, and acquires an image that shows the vehicle cabin interior (second captured image), and the routine moves on to step 102.

In step 102, the CPU 18A controls the rear camera 14 so as to carry out rearward imaging by the rear camera 14, and acquires an image that shows the rear of the vehicle (first captured image), and the routine moves on to step 104.

In step 104, the CPU 18A converts the image that shows the vehicle cabin interior and the image that shows the rear of the vehicle to become images projected onto the virtual screen 24, and the routine moves on to step 106. Namely, as described above by using FIG. 4, the images are converted into images of a state in which a scene, in which the window positions are set in the scene in which the rear of the vehicle is seen regularly from the virtual viewpoint 22 that is set in front of the vehicle, is projected onto the virtual screen 24.

In step 106, the CPU 18A combines the converted image that shows the vehicle cabin interior and the converted image that shows the rear of the vehicle, and effects control so as to display the combined image on the monitor 16, and the routine returns to step 100 and the above-described processings are repeated. For example, the images are combined such that the image that shows the rear of the vehicle is displayed in the window portions of the image that shows the vehicle cabin interior. Due thereto, the image that shows the rear of the vehicle can be displayed through the windows. Further, the images through the rear side window glasses that are displayed on the monitor 16 are longer than the apparent widths that are actually seen from the inner rearview mirror 20. Therefore, the visibility of the rearward field of view through the rear side window glasses can be improved. Note that, at the time of combining the image that shows the vehicle cabin interior and the image that shows the rear of the vehicle, these images may be combined by adding a predetermined transparency to the image that shows the vehicle cabin interior. Due thereto, the peripheral portions that are hidden in the image that shows the vehicle cabin interior can be displayed, and the visibility of the periphery of the vehicle can be improved.

Note that the above-described embodiment describes an example in which the inner rearview mirror camera 12 is provided, and an image of the vehicle cabin interior is captured so as to include passengers. However, the present disclosure is not limited to this. For example, the inner rearview mirror camera 12 may be omitted, and an image that shows the vehicle cabin interior, in which the vehicle cabin interior has been captured in advance, may be stored, and the stored image that shows the vehicle cabin interior may be read-out instead of step 100, although passengers cannot be displayed therein.

Further, the above-described embodiment describes an example in which the inner rearview mirror camera 12 is disposed at the position of the inner rearview mirror 20, but a camera may be disposed at another position provided that it is a position at which the rear of the vehicle, including the vehicle cabin interior, can be captured.

Further, description has been given in which the processings that are carried out at the control device 18 in the above-described embodiment are software processings, but the present disclosure is not limited to this. For example, the processings that are carried out at the control device 18 may be processings that are carried out by hardware, or may be processings combining both hardware and software.

Further, the processings that are carried out at the control device 18 in the above-described embodiment may be stored as a program on a storage medium and distributed.

The half-mirror, which is provided at the display surface side of the monitor 16 in the above-described embodiment, may be a planar mirror. However, by using an optical mirror having a curved surface, the effect that the width of the rear side window glass appears to be narrow is mitigated somewhat, and therefore, a mirror that has a curved surface shape may be utilized. Due thereto, the difference between the image of the monitor 16 and the image of the half-mirror is reduced, and the sense of incongruity at the time when the monitor 16 is not carrying out display is suppressed.

Moreover, the present disclosure is not limited to the above, and, other than the above, can of course be implemented by being modified in carious ways within a scope that does not depart from the gist thereof.

What is claimed is:

1. A viewing device for a vehicle, comprising:
an exterior camera that captures an image of a rear of a vehicle from a vehicle exterior; and
a monitor and control device that carries out image processing that combines a first captured image that has been captured by the exterior camera and a second captured image that is captured by a vehicle cabin interior camera and shows a vehicle cabin interior in which a vehicle rear including the vehicle cabin interior is captured from the vehicle cabin interior, such that a region of a rear side window glass becomes longer than an apparent width of the rear side window glass that is actually seen from a position of capturing the second captured image, and displays the images,
wherein the monitor and control device carries out image processing that converts the first captured image and the second captured image respectively so as to become captured images that are seen from virtual viewpoints that are set at respective predetermined positions, and respectively converts the images so as to become captured images that are respectively projected from the virtual viewpoints onto a virtual screen that is provided at the rear of the vehicle and is curved convexly rearward, and converts the respective converted captured images into captured images that are expanded planarly, and the monitor and control device displays the images, wherein the vehicle cabin interior camera is disposed at an upper portion of the center between the front seats within the vehicle cabin; and wherein the virtual viewpoints are set farther toward the vehicle front side than at least the position at the vehicle cabin interior camera.

2. The viewing device for a vehicle of claim 1, wherein the monitor is disposed at a position of an inner rearview mirror and has, at a display surface side thereof, a half-mirror that has a curved surface shape.

3. The viewing device for a vehicle of claim 1, wherein the monitor is disposed at a position of an inner rearview mirror and has, at a display surface side thereof, a half-mirror of a viewpoint that differs from a viewpoint of a captured image that is displayed.

4. A method of displaying a viewed image for a vehicle, comprising:

capturing, by an imaging portion, an image of a rear of a vehicle from a vehicle exterior; and carrying out image processing that combines a first captured image that has been captured by the imaging portion, and a second captured image that shows a vehicle cabin interior in which a vehicle rear including the vehicle cabin interior is captured from the vehicle cabin interior, such that a region of a rear side window glass is longer than an apparent width of the rear side window glass that is actually seen from a position of capturing the image that shows the vehicle cabin interior, and displaying the images on a display portion, wherein the image processing is processing that converts the first captured image and the second captured image respectively so as to become captured images that are seen from virtual viewpoints that are set at respective predetermined positions, and respectively converts the images so as to become captured images that are respectively projected from the virtual viewpoints onto a virtual screen that is provided at the rear of the vehicle and is curved convexly rearward, and converts the respective converted captured images into captured images that are expanded planarly, wherein the second captured image is captured by a vehicle cabin interior camera that is disposed at an upper portion of the center between the front seats within the vehicle cabin, and wherein the virtual viewpoints are set farther toward the vehicle front side than at least the position at the vehicle cabin interior camera.

* * * * *